United States Patent
Lin (12)

(10) Patent No.: US 6,533,512 B2
(45) Date of Patent: Mar. 18, 2003

(54) QUICK-DETACHABLE DEVICE FOR ATTACHING ROPES THERETO

(76) Inventor: Chia-Sheng Lin, No. 114, Sec. 1, Yung-Po Rd., Pun-Hsin Hsiang, Changhua Hsien (TW)

( * ) Notice: Subject to any disclaimer, the term of this patent is extended or adjusted under 35 U.S.C. 154(b) by 0 days.

(21) Appl. No.: 09/851,960

(22) Filed: May 10, 2001

(65) Prior Publication Data

US 2002/0168242 A1 Nov. 14, 2002

(51) Int. Cl.[7] .................................................. B60P 7/08
(52) U.S. Cl. ....................... 410/102; 410/106; 410/107; 410/111; 410/116
(58) Field of Search ................................. 410/102, 101, 410/106, 107, 110, 111, 116; 24/265 CD, 134 L, 136 R, 115 K; 248/499

(56) References Cited

U.S. PATENT DOCUMENTS

| | | | | |
|---|---|---|---|---|
| 2,729,418 A | * | 1/1956 | Maynard | 410/102 |
| 3,102,708 A | * | 9/1963 | Crain | 410/107 |
| 4,741,653 A | * | 5/1988 | Schmidt | 410/111 |
| 5,106,248 A | * | 4/1992 | Harris | 410/107 |
| 5,971,684 A | * | 10/1999 | Wang | 410/107 |

* cited by examiner

Primary Examiner—Stephen T. Gordon
(74) Attorney, Agent, or Firm—Rosenberg, Klein & Lee

(57) ABSTRACT

The present inventive relates to a quick-detachable device for attaching ropes thereto, including a first rope with a hooked end and a second rope with a plain end. The device includes a hollow body having a front opening, a clasp and a chuck both received in the hollow body. The clasp has a ring operable to be turned outward from the front opening of the body for hitching the first rope thereto, while chuck has a first jaw and a second jaw operable to be moved outward from the front opening through the ring for holding the second rope therebetween. In addition, a first actuator is provided for controlling the outward turn of the ring of the clasp from the front opening, and a second actuator is provided for controlling the outward movement of the jaws of the chuck from the front opening. The actuators have respective buttons available from a front face of the hollow body for operating the actuators.

16 Claims, 11 Drawing Sheets

QUICK-DETACHABLE DEVICE FOR ATTACHING ROPES THERETO

BACKGROUND OF THE INVENTION

1. Field of the Invention

The present invention relates to a quick-detachable device for attaching ropes thereto and, more particularly, to a quick-detachable device for attaching ropes, either with a hooked end or with a plain end, thereto.

2. Description of Related Art

A truck is typically provided with hooks along its body for attaching ropes thereto so that a tarpaulin for example may be tightly secured over a load. These hooks are generally not shielded, which brings risks to the surroundings, particularly in traffic accidents when a victim may be gouged by such hooks.

A concealed type device for hitching a rope thereto is known. The device includes a hollow body having a front opening, with a spring-loaded staple received in the hollow body. The spring-loaded staple is operable to be moved outward from the front opening simply by pressing a button on the body. Although the staple may be hidden in the hollow body, it is applicable only to a rope with a hook at its end, which restricts the application of the device.

A concealed-type device for holding a rope therein is also known. This device includes a hollow body formed with a through-hole for allowing a rope to pass therethrough. In this device a toothed, spring-loaded slider is movable in the hollow body between a first position, in which the through-hole is opened, and a second position, in which the rope may be held in the through-hole.

However, this device is applicable only to a rope without a hook at its end, due to the limited diameter of the through-hole. Additionally, the rope is pressed by the toothed slider against a smooth face, which may offer a friction insufficient to hold the rope, particularly when the truck provided with this device is subjected to vibration and rolling.

Therefore, it is an objective of the invention to provide a quick-detachable device for attaching ropes thereto to mitigate and/or obviate the aforementioned problems.

SUMMARY OF THE INVENTION

The object of the present invention is to provide a quick-detachable device for attaching ropes, either with a hooked end or with a plain end, thereto.

Another object of the present invention is to provide a quick-detachable device for holding a rope with a plain end securely.

Still another object of the present invention is to provide a quick-detachable device with a compact configuration.

Another object of the present invention is to provide a quick-detachable device which is operated easily.

Other objects, advantages and novel features of the invention will become more apparent from the following detailed description when taken in conjunction with the accompanying drawings.

DETAILED DESCRIPTION OF THE PREFERRED EMBODIMENT

Figure 1:
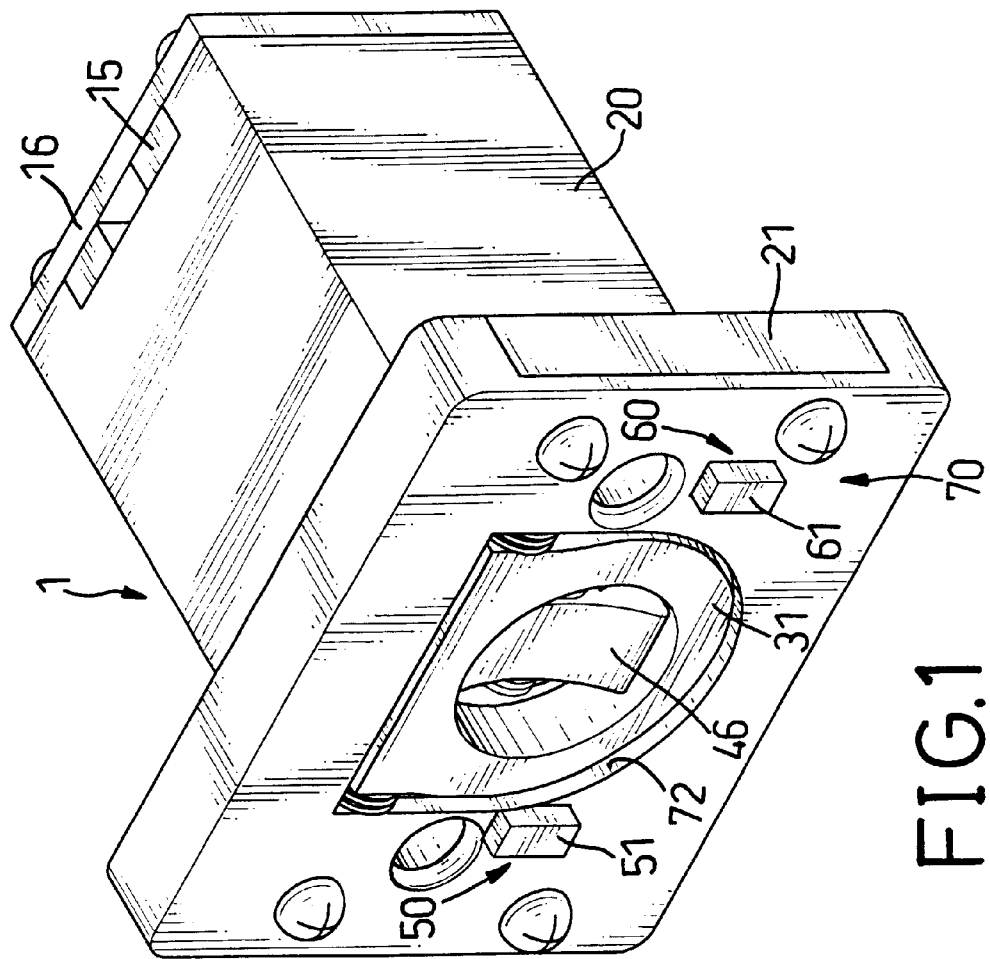
FIG. 1 is a perspective view of a preferred embodiment of a quick-detachable device in accordance with the present invention from attaching ropes thereto.
Figure 2:
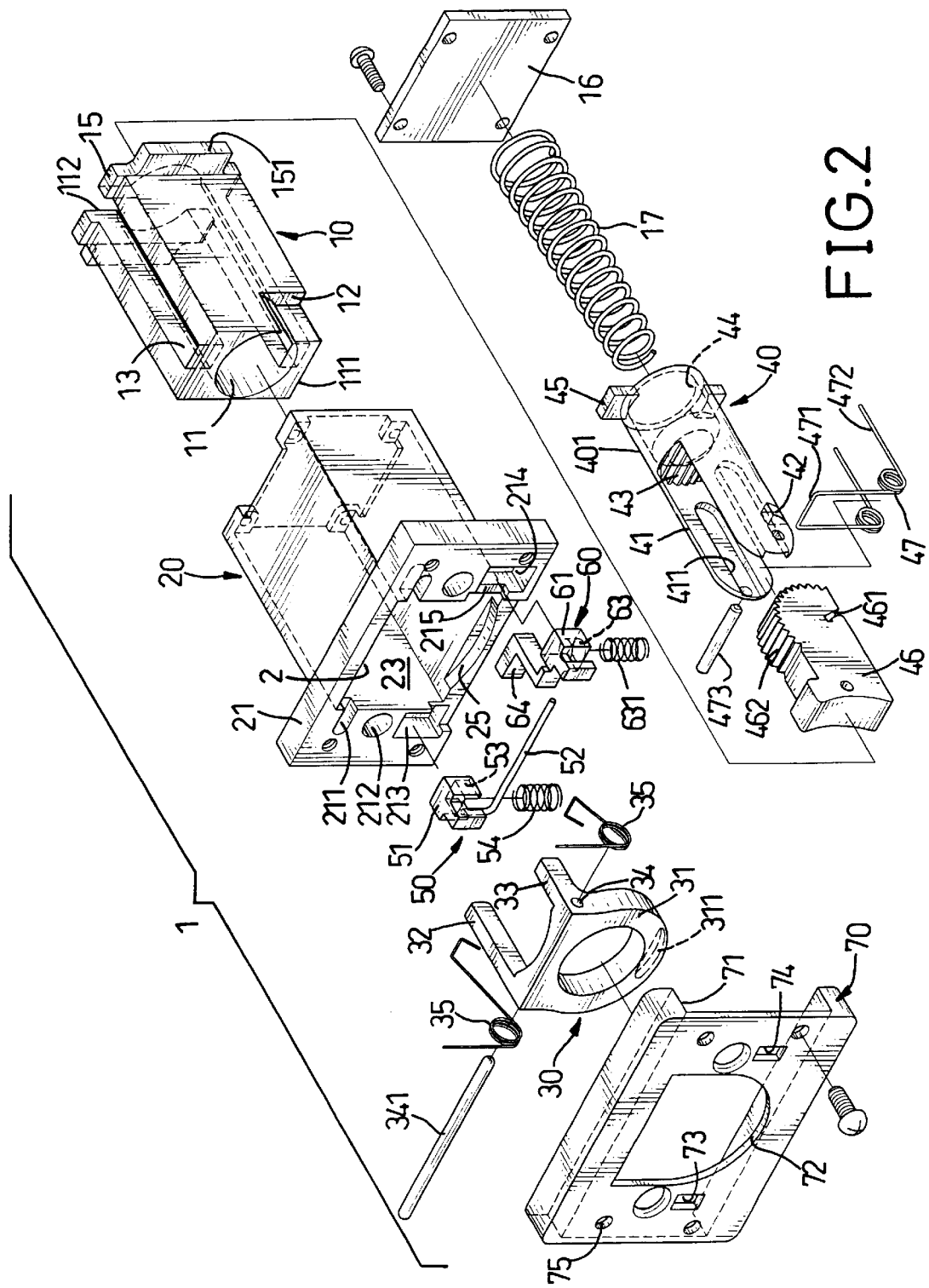
FIG. 2 is an exploded perspective view of the quick-detachable device shown in FIG. 1.

Referring to FIGS. 1 and 2, there is shown a preferred embodiment of a quick-detachable device in accordance with the present invention for attaching ropes of a vehicle thereto. The quick-detachable device includes a hollow body (1) with a front opening (2) for receiving a clasp (30) and a chuck (40) therein.

However, the clasp (30) is operable to be turned outward and the chuck (40) is operable to be moved outward from the front opening (2) both by operating buttons (51, 61), respectively.

Referring to FIG. 2, the hollow body (1) consists of a tubular shell (20) with a front cover (70) and a back cover (16) respectively mounted at front and rear ends thereof.

The tubular shell (20) includes a front flange (21) with a plurality of threaded holes (212), and a chamber (23) extending through the shell (20), i.e. from the flange (21) to the rear end of the shell (20). The front cover (70) has a central opening (72) aligned with the chamber (23) of the shell (20), thus forming the front opening (2) for receiving the clasp (30).

The clasp (30) is configured as a ring (31) formed with two parallel legs (32, 33) extending backward therefrom. The ring (31) is pivotally connected to the tubular shell (20), by means of a pin (341) that extends through a transverse hole (34) of the ring (31) with two ends of the pin (341) received in a pair of aligned slots (211), interrupted by the chamber (23), of the flange (21) of the shell (20).

Figure 5:
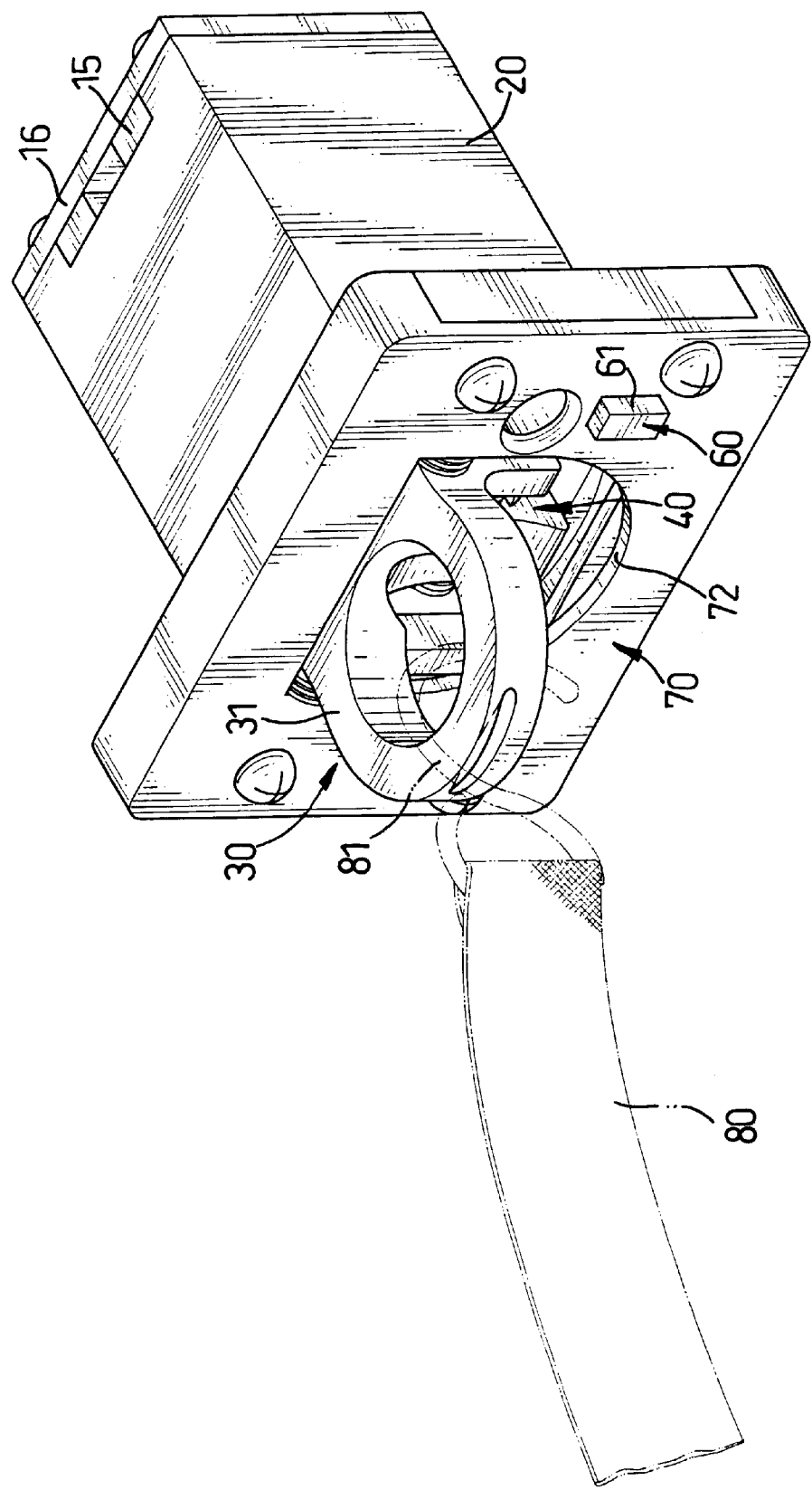
FIG. 5 is a perspective view of the device of FIG. 1, showing a ring turned outward and a first rope hitched to the ring.

As illustrated, the clasp (30) is spring-loaded by a pair of torsion springs (35) mounted around the pin (341) at opposed ends thereof. Each of the torsion springs (35) has a straight shank abutting an inner wall of the shell (20) and a U-shaped shank abutting a corresponding one of the legs (32, 33) of the ring (31) in such a way that the ring (31) may be pivotally turned by the action of the springs (35) away from a nestle (25) and outward from the central opening (72) of the front cover (70), as best shown in FIG. 5, unless the ring (31) is retained in place at the nestle (25) in the chamber (223) of the shell (20).

Figure 3:
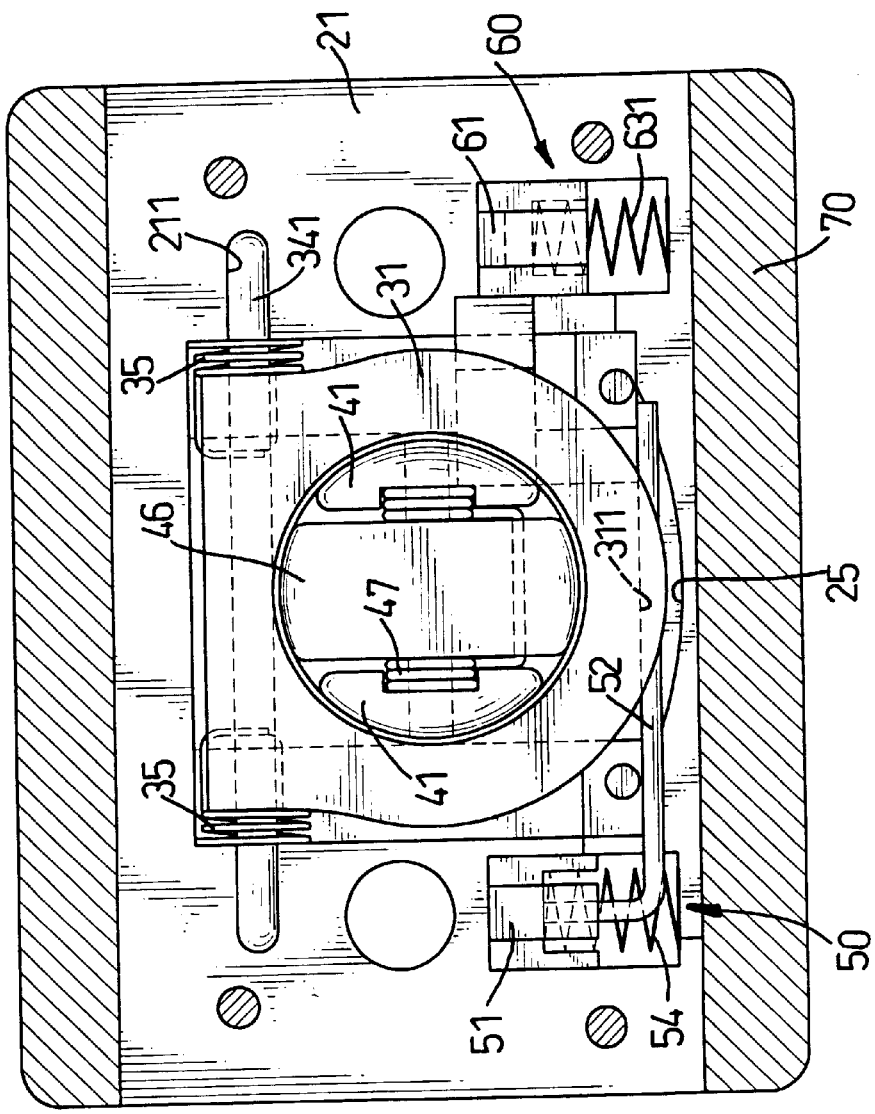
FIG. 3 is a cross-sectional front view of the device shown in FIG. 1.

Referring to FIGS. 2 and 3, the flange (21) of the tubular shell (20) has a pair of cavities (213, 214) defined respectively at two sides of the chamber (23). The first one of the cavities (213, 214) is provided for receiving a first actuator (50) that normally retains the ring (31) in place in the chamber (23) of the tubular shell (20).

In the illustrated embodiment, the first actuator (50) includes the first button (51), which is mentioned above with reference to FIG. 1. The first button (51) is movable in the first cavity (213) between an upper position and a lower position, and has a first bore (53) for receiving a first helical spring (54) to urge the button (51) to the upper position.

Figure 4:
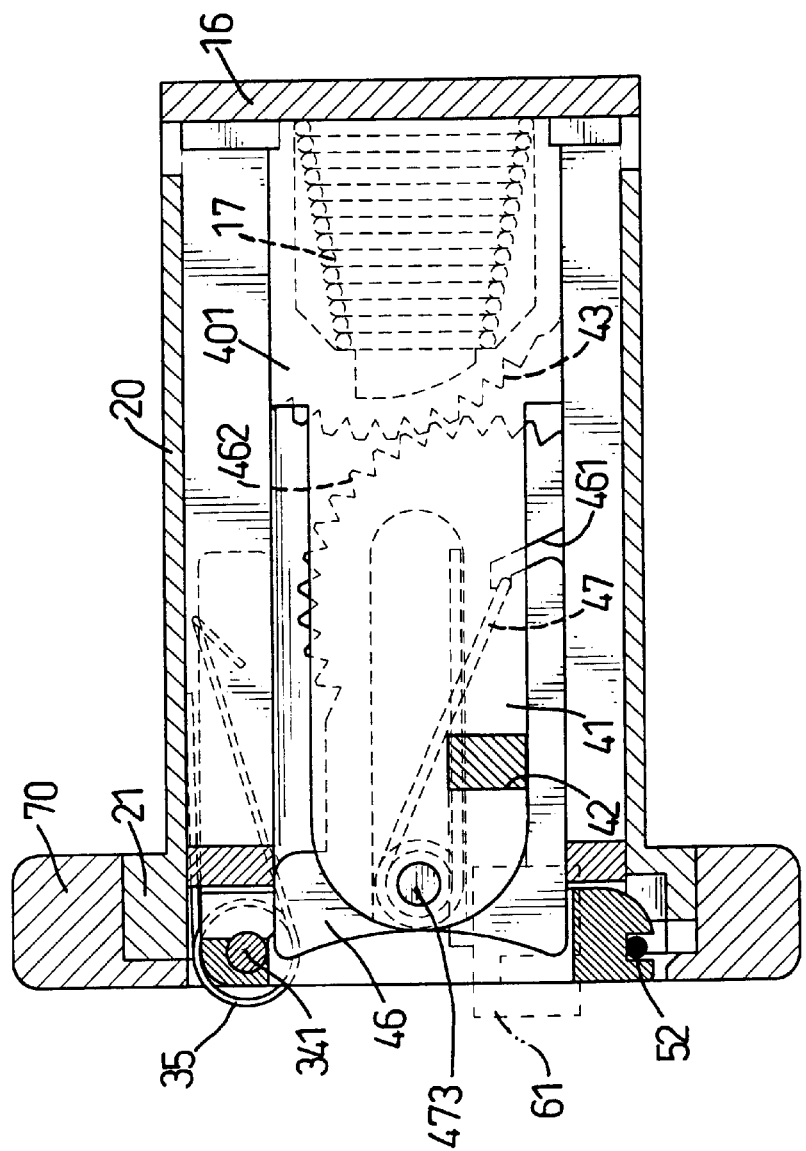
FIG. 4 is a cross-sectional side view of the device shown in FIG. 1.

The first actuator (50) further includes a bar (52) laterally extending from the button (51) and adapted to be moved into a channel (311) defined in an underside of the ring (31), thereby retaining the ring (31) in place in the chamber (23) of the shell (20), as best shown in FIGS. 3 and 4.

Referring to FIGS. 2 and 4, retained in the chamber (23) of the tubular shell (20) behind the ring (31) is a guide (10) that has a front end (111) and a rear end (112). The guide (10) preferably has formed at its rear end (112) a plurality of tenons (15) to be held in a rear indentation (not numbered) of the shell (20), and a pair of lateral extensions (151) to be engaged with the rear end of the shell (20). Additionally, the guide (10) has a through-hole (11) extending from its front end (111) to its rear end (112) for receiving the chuck (40).

The chuck (40) includes a first jaw (401) and a second jaw (46). The first jaw (401) has a front end and a rear end, with a pair of spaced arms (41) extending forward from the front end thereof, and with a plurality of first teeth (43) formed on the front end between the spaced arms (41). The second jaw (46) is pivotally connected to the first jaw (401) between the spaced arms (41), by means of a pintle (473), and has a plurality of second teeth (462) engagable with the first teeth (43) of the first jaw (401).

The second jaw (46) is additionally spring-loaded by a U-shaped spring (47) mounted around the pintle (473). The spring (47) here is formed with a U-shaped end positioned in a bottom slit (461) of the second jaw (46) and with a pair of shanks (472) positioned in respective narrow slots (411) of the arms (41), thereby providing the second jaw (46) with a tendency to be rotated, relative to the first jaw (401), to bring the second teeth (462) closer to the first teeth (43).

Furthermore, the guide (10) has a pair of opposed grooves (13) parallel to and open to the through-hole (11), while the first jaw (401) has a pair of wings (45) extending into and movable along the grooves (13) of the guide (10), in order to ensure the correct movement of the chuck (40) or the assembled jaws (401, 46) outward from the central opening (72) of the front cover (70) through the ring (31) of the clasp (30).

The outward movement of the chuck (40) is urged by a compression spring (17) which, preferably received at least partially in a bore (44) defined in a rear end of the first jaw (401), is compressed between the first jaw (401) and the back cover (16). As a result, the chuck (40) will be moved outward unless being retained in place in the through-hole (11) of the guide (10).

Referring still to FIG. 2 and back to FIG. 3, the second one of the cavities (213, 214) is in communication with the through-hole (11), such as via a recess (215) defined in the tubular shell (20) and a cutout (12) defined in the guide (10). The second cavity (214) is provided for receiving a second actuator (60) that normally retains the chuck (40) in place in the through-hole (11) of the guide (10).

Similar to the first actuator (50), the second actuator (60) includes the second button (61), which is also mentioned above with reference to FIG. 1. The second button (61) is movable in the second cavity (214) between an upper position and a lower position, and has a second bore (63) for receiving a second helical spring (631) that urges the button (61) to its upper position.

The second actuator (60), however, further includes a polygonal tumbler (64) operable to be moved into a notch (42) defined in one of the arms (41) of the first jaw (401), thereby retaining the ring (31) in place in the chamber (23) of the shell (20), as best shown in FIG. 4.

Now descriptions about the front cover (70) are to be made. The front cover (70) is preferably formed with a recess (71) engaged with the front flange (21) of the tubular shell (20) to provide the correct alignment of the central opening (72) with the chamber (23). The front cover (70) is fixed to the tubular shell (20), by means of screws (only one of them is shown) which extend through a plurality of orifices (75) of the front cover (70) and are screwed into the threaded holes (212) of the flange (21).

Importantly, the front cover (70) includes a pair of ports (73, 74) in alignment with the cavities (213, 214) to allow the buttons (51, 61) of the actuators (50, 60) to extend therethrough and to project from the front cover (70), thereby making the two buttons (51, 61) available from a front side of cover (70).

Figure 6:
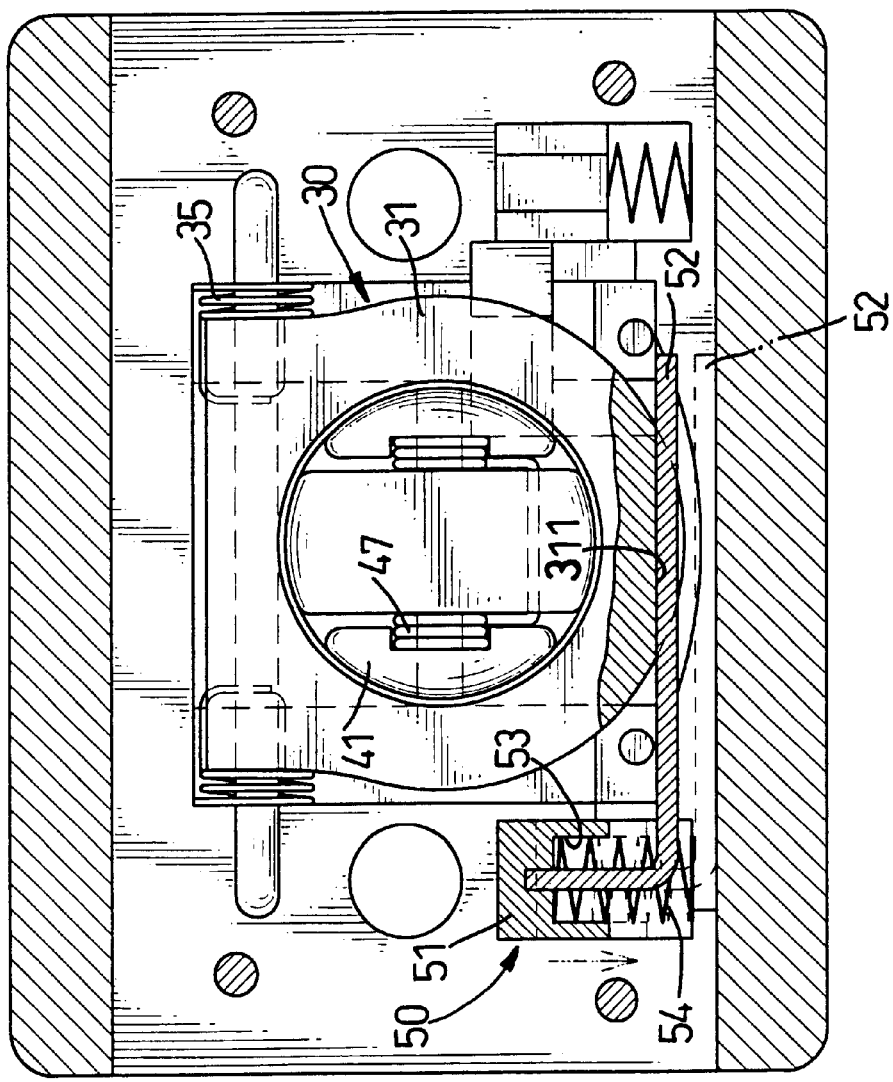
FIG. 6 is a cross-sectional front view of the device of FIG. 1, showing the operation for the outward turn of the ring.
Figure 7:
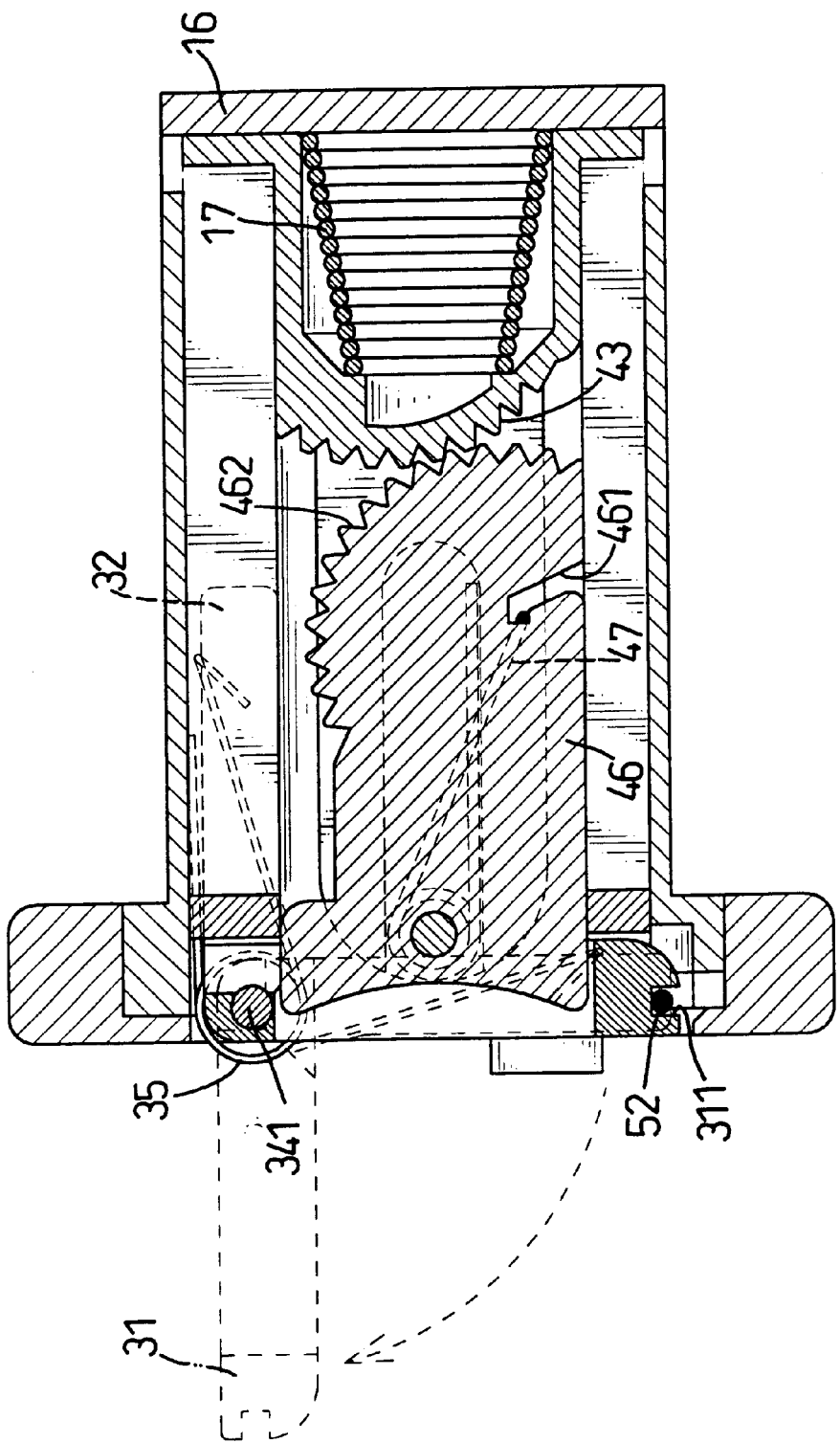
FIG. 7 is a cross-sectional side view of the device of FIG. 1, showing the operation for the outward turn of the ring.
Figure 8:
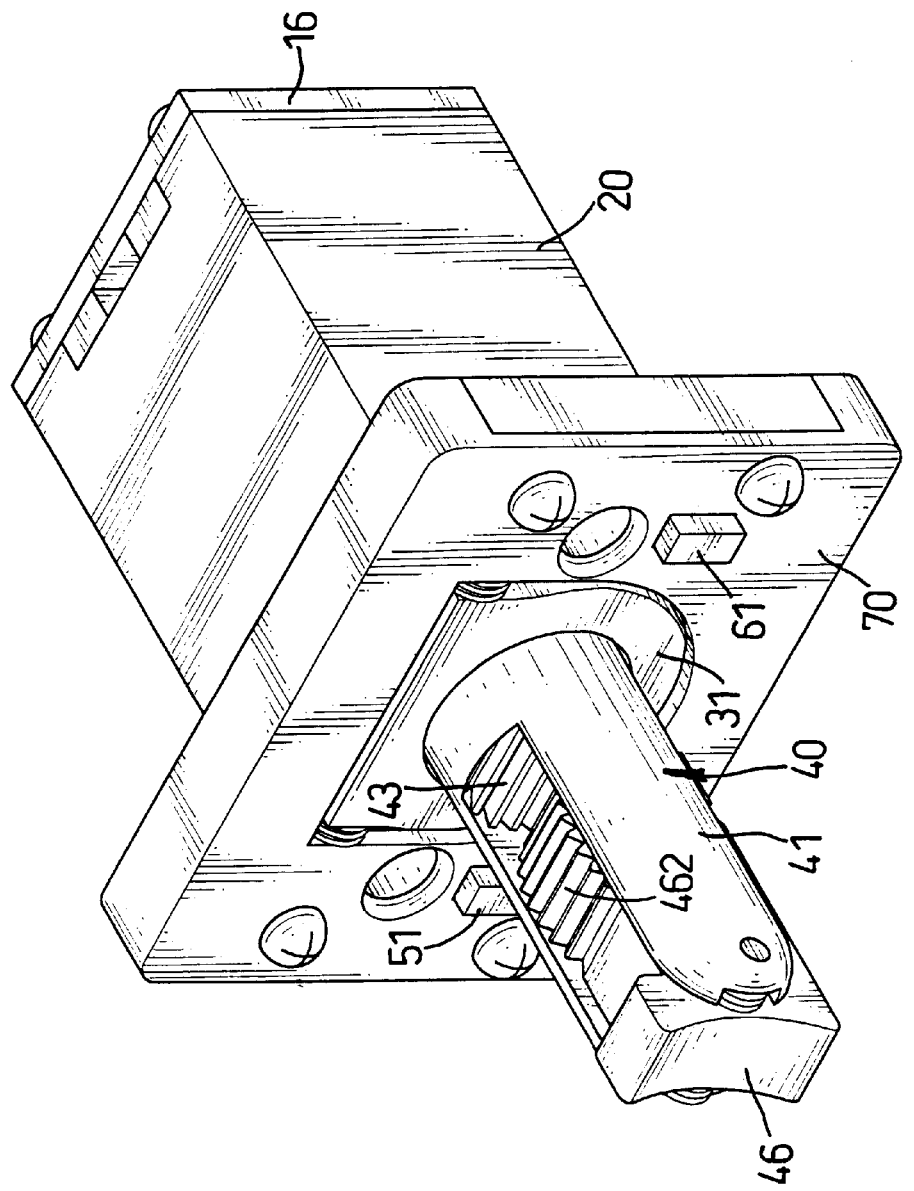
FIG. 8 is a perspective view of the device of FIG. 1, showing a chuck moved outward.

Referring to FIGS. 5 to 7, the ring (30) can be pivotally turned outward from the central opening (72) of the front cover (70) simply by moving the first button (51) down, i.e. to its lower position, as shown in FIG. 6.

The bar (52) of the first actuator (50) then follows the downward movement of first button (51) and is finally moved away from the channel (311) of the ring (31). As a result, the ring (31) is released and is turned outward, about the pin (341), from the central opening (72) of the front cover (70) by the action of the torsion springs (35), as shown in FIG. 6. This means that the first actuator (50) is operable to control the outward turn of the ring (31) from the opening (72) of the cover (70).

At this time, a rope (80) with a hook (81) at its end can be hitched to the ring (31) and, in turn, to where the inventive device is fitted on.

The ring (31) can be restored by turning it back, about the pin (241), towards the central opening (72) of the front cover (70), and by moving the first button (51) down once more. As the ring (31) reaches its destination, the first button (51) is released and the bar (52) will be moved, by the compressed first helical spring (54), into the channel (311) of the ring (31), retaining the ring (31) in place in the tubular shell (20) again.

Figure 9:
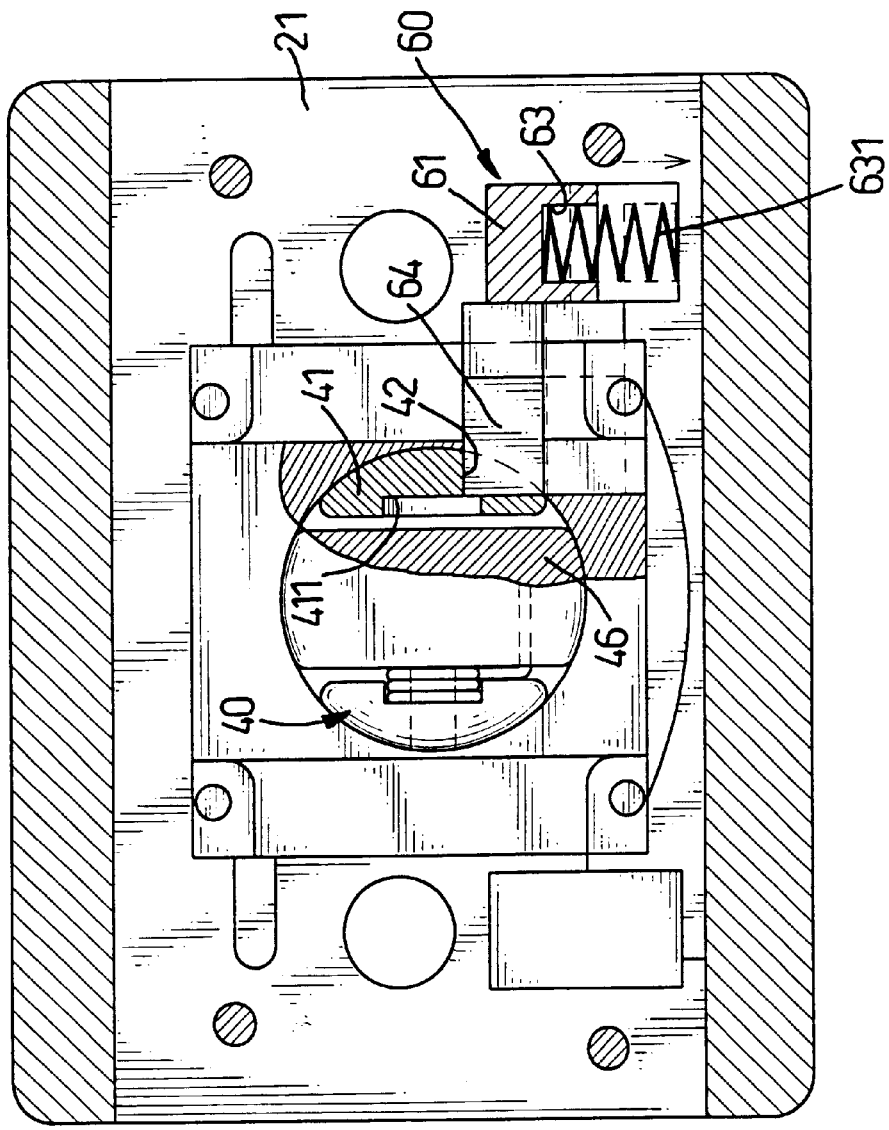
FIG. 9 is a cross-sectional front view of the device of FIG. 1, showing the operation for the outward movement of the chuck.

Referring to FIGS. 8 to 11, the chuck (40) can be moved outward from the central opening (72) of the front cover (70) simply by moving the second button (61) down, i.e. to its lower position, as shown in FIG. 9.

Figure 10:
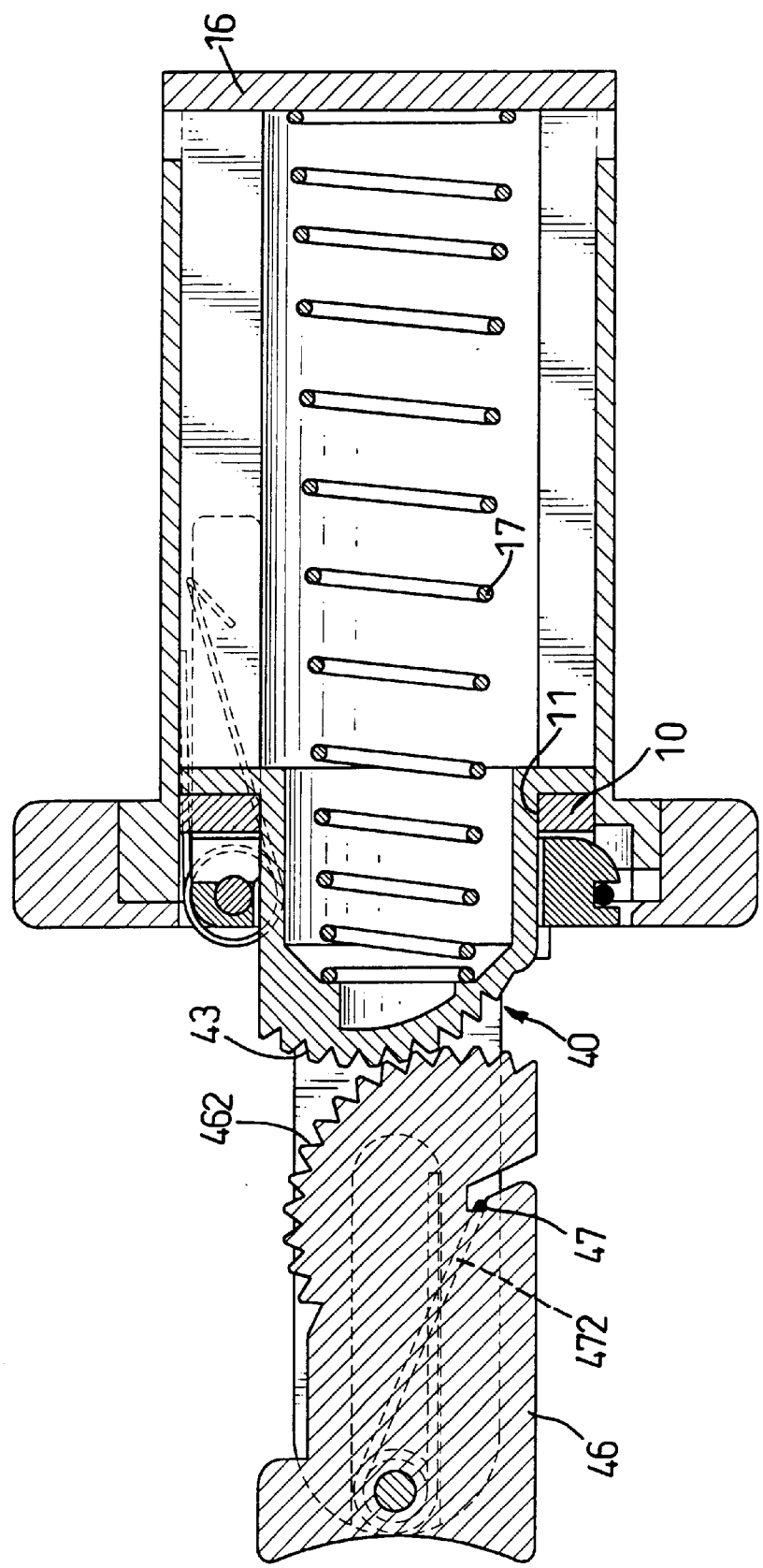
FIG. 10 is a cross-sectional side view of the device of FIG. 1, showing the chuck to be put into use.
Figure 11:
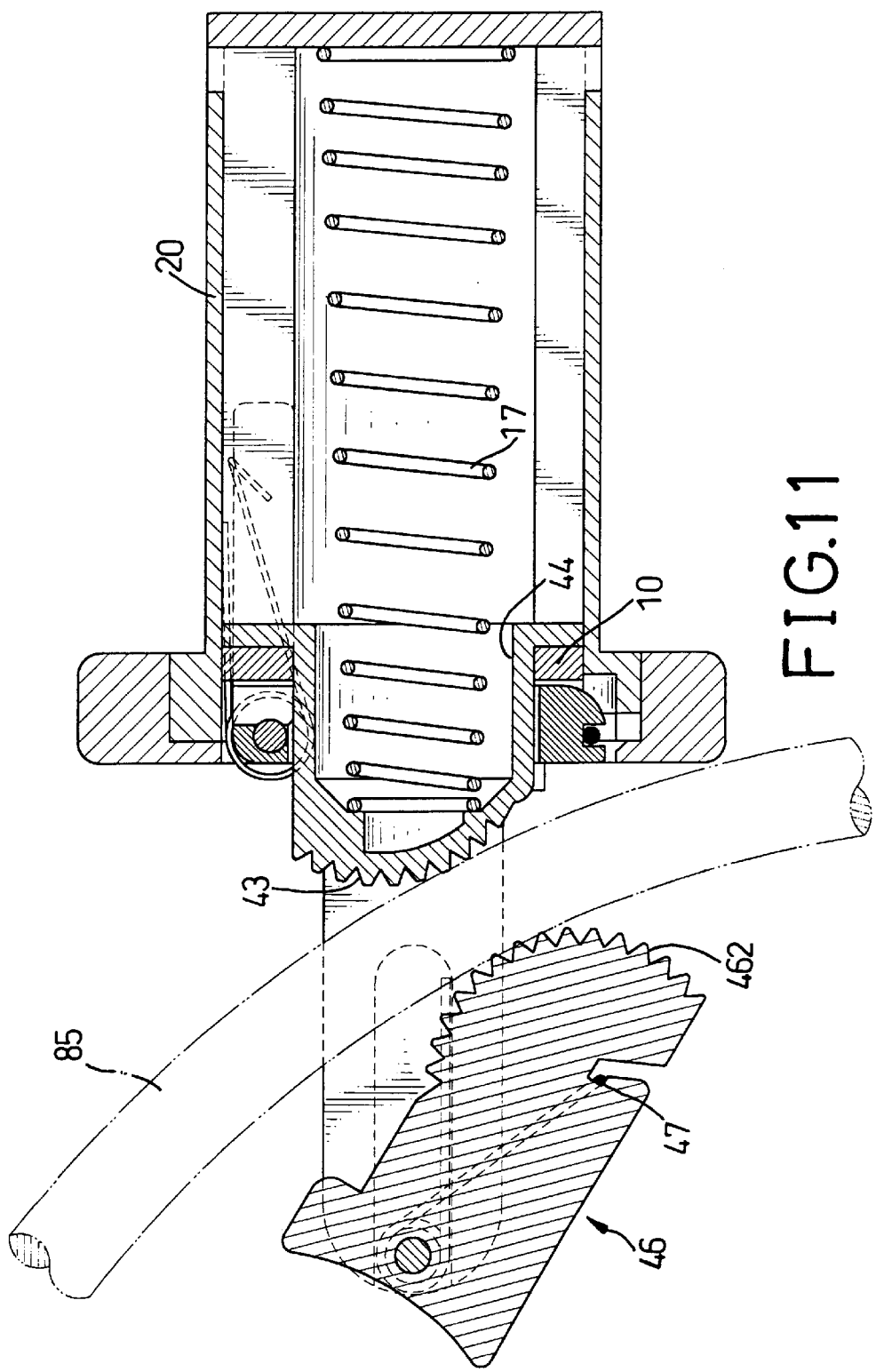
FIG. 11 is a cross-sectional side view of the device of FIG. 1, showing a second rope held by the chuck.

The tumbler (64) of the second actuator (60) then follows the downward movement of the second button (61) and is finally moved away from the notch (42) of the first jaw (401). As a result, the chuck (40) is released and is moved outward from the central opening (72) of the front cover (70) through the ring (31), by the action of the compression springs (17), as shown in FIG. 10. This means that the second actuator (60) is operable to control the outward movement of the chuck (40) from the opening (72) of the cover (70).

Now, a rope (80) (as shown in FIG. 5) with a plain end can pass through an interspace between the jaws (401, 46) after the second jaw (46) is turned against the action of the U-shaped spring (47). Once the second jaw (46) is released, the rope (85) is securely held between the jaws (401, 46) due both to the teeth (43, 462)) and to the action of the U-shaped spring (47), which causes the second jaw (46) to bring the second teeth (462) as close as possible to the first teeth (43) of the first jaw (401).

The chuck (40) can be restored by moving it back towards the central opening (72) of the front cover (70), and by moving the second button (61) down once more. As the chuck (40) reaches its destination, the second button (61) is released and the tumbler (64) will be moved, by the compressed second helical spring (631), into the notch (42) of the first jaw (401), retaining the ring (31) in place in the tubular shell (20) again.

From the above description, it is noted that the invention has the following advantages:

1. multifunction:

Because of the ring (31) and the chuck (40), the inventive device is applicable for the ropes (80) either with or without the hook (85).

2. compactness:

Because the chuck (40) is moved outward from the central opening (72) of the front cover (70) through the ring (31), the inventive device can be made in a significantly compact configuration.

3. simple operation:

Because both the ring (31) and the chuck (40) are actuated by moving the buttons (51, 61) independently, the inventive device can be operated simply;

4. security in holding the rope (85):

Because of the teeth (43, 462) of the jaws (401, 46), the chuck (40) can hold the rope (85) securely.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A quick-detachable device for attaching ropes (80, 85) thereto, said ropes (80, 85) including a first rope (80) with a hooked end and a second rope (85) with a plain end, said device comprising:

a hollow body (1) having a front opening (2);

a clasp (30) received in said hollow body (1), said clasp (30) having a ring (31) operable to be turned outward from said front opening (2) of said body (1) for hitching said first rope (80) thereto;

a chuck (40) received in said hollow body (1), said chuck (40) having a first jaw (401) and, a second jaw (46) operable to be moved outward from said front opening (2) of said body (1) through said ring (31) for holding said second rope (85) therebetween;

a first actuator (50) for controlling the outward turn of said ring (31) of said clasp (30) from said front opening (2);

a second actuator (60) for controlling the outward movement of said jaws (401, 46) of said chuck (40) from said front opening (2); and wherein said first actuator (50) has a first button (51) and said second actuator (60) has a second button (61,), with said buttons (51, 61) being both available from a front face of said hollow body (1) for operating said actuators (50, 60).

2. The quick-detachable device as claimed in claim 1, wherein said clasp (30) is spring-loaded in such a way that said ring (31) may be turned outward from said front opening (2) of said hollow body (1) when said first button (51) of said first actuator (50) is operated.

3. The quick-detachable device as claimed in claim 2, wherein said chuck (40) is spring-loaded in such a way that said jaws (401, 46) may be moved outward from said front opening (2) of said hollow body (1) when said second button (61) of said second actuator (60) is operated.

4. The quick-detachable device as claimed in claim 3, wherein said first jaw (401) has a front end and a rear end, and is formed with a pair of spaced arms (41) extending forward from said front end thereof, and wherein said second jaw (46) is pivotally connected to said first jaw (401) between said spaced arms (41).

5. The quick-detachable device as claimed in claim 4, wherein said first jaw (401) has a plurality of first teeth (43) formed on said front end thereof between said spaced arms (41), and wherein said second jaw (46) has a plurality of second teeth (462) engagable with said first teeth (43) of said first jaw (401).

6. The quick-detachable device as claimed in claim 5, wherein said second jaw (46) is spring-loaded so as to have a tendency to be rotated, relative to said first jaw (401), to bring said second teeth (462) close to said first teeth (43).

7. The quick-detachable device as claimed in claim 6, wherein said hollow body (1) includes a tubular shell (20) covered with a front cover (70) and a back cover (16) respectively mounted at opposed ends of the tubular shell (20), and wherein said tubular shell (20) has a chamber (23) extending therethrough and said front cover (70) has a central opening (72) aligned with said chamber (23) of said tubular shell (20), thereby forming said front opening (2) of said hollow body (1).

8. The quick-detachable device as claimed in claim 7, further including a guide (10) retained in place in said chamber (23) of said tubular shell (20) to guide correct movement of said jaws (401, 46) relative to said hollow body (1).

9. The quick-detachable device as claimed in claim 8, wherein said guide (10) has a through-hole (11) for receiving said jaws (401, 46).

10. The quick-detachable device as claimed in claim 9, wherein said guide (10) further has a pair of opposed grooves (13) parallel to and open to said through-hole (11), and wherein said first jaw (401) has a pair of wings (45) extending into and movable along said grooves (13), thereby ensuring the correct movement of said jaws (401, 46) with respect to said hollow body (1).

11. The quick-detachable device as claimed in claim 7, wherein said first jaw (401) has a bore (44) defined in said rear end thereof, and wherein a compression spring (17) is received at least partially in said bore (44) and compressed between said first jaw (401) and said back cover (16), thereby moving said chuck (40) outward from said front opening (2) of said hollow body (1) when said second button (61) of said second actuator (60) is operated.

12. The quick-detachable device as claimed in claim 11, wherein said tubular shell (20) is formed with a front flange (21).

13. The quick-detachable device as claimed in claim 12, wherein said flange (21) of said tubular shell (20) has a pair of cavities (213,214) defined at two sides of said chamber (23) for receiving said actuators (50, 60), and wherein said front cover (70) has a pair of ports (73, 74) in alignment with said cavities (213, 214) to allow said buttons (51, 61) of said actuators (50, 60) to extend therethrough and to project from said front cover (70), thereby making said buttons (51, 61) available from said front face of said hollow body (1).

14. The quick-detachable device as claimed in claim 13, wherein said ring (31) of said clasp (30) has a channel (311) defined therein, and wherein said first actuator (50) has a bar (52) adapted to be moved into said channel (311) of said ring (31).

15. The quick-detachable device as claimed in claim 14, wherein said first jaw (401) of said chuck (40) has a notch (42) defined therein, and wherein said second actuator (60) has a tumbler (64) adapted to be moved into said notch (42) of said first jaw (401).

16. The quick-detachable device as claimed in claim 15, wherein said flange (21) of said tubular shell (20) has a pair of aligned slots (211) interrupted by said chamber (23), and wherein said clasp (30) has a pin extending through said ring (31) and received in said slots (211) of said flange (21), thereby pivotally connecting said ring (31) to said hollow body (1).

* * * * *